United States Patent [19]

Gallant

[11] 4,161,660
[45] Jul. 17, 1979

[54] APPARATUS FOR PRODUCING A TIME-PROPORTIONED CONTROL SIGNAL ELECTRONICALLY

[75] Inventor: Donald A. Gallant, Charlotte, N.C.

[73] Assignee: Longwood Machine Works, Inc., Woodside, N.Y.

[21] Appl. No.: 829,487

[22] Filed: Aug. 31, 1977

[51] Int. Cl.² .......................................... H01H 35/42
[52] U.S. Cl. .................................. 307/118; 236/44 R; 328/4
[58] Field of Search ............... 307/118, 308, 116, 117, 307/141; 328/4; 200/61.06; 236/44 R, 44 A, 44 B, 44 C, 44 E; 340/602, 604

[56] References Cited

U.S. PATENT DOCUMENTS

3,460,557  8/1969  Gallant .................................. 137/82
4,063,112  12/1977  Dumbeck ............................. 307/116

Primary Examiner—J. V. Truhe
Assistant Examiner—Morris Ginsburg
Attorney, Agent, or Firm—Richards, Shefte & Pinckney

[57] ABSTRACT

A solid state electronic controller for humidification devices employs an electronic humidity sensor to create an electronic signal proportional to the humidity in the space to be controlled, and massages or processes this proportional signal to create a cyclic series of time-proportioned control signals to cause the operation of the humidification devices in each cycle for a period proportional to the difference between the sensed humidity and the desired humidity.

23 Claims, 3 Drawing Figures

Fig. 2a

APPARATUS FOR PRODUCING A TIME-PROPORTIONED CONTROL SIGNAL ELECTRONICALLY

BACKGROUND OF THE INVENTION

Moisture-delivering atomizers are widely used in the textile industry to produce a desired level of humidity in production spaces. When moisture delivered as a spray of very fine droplets evaporates into vapor, sensible heat is converted into latent heat, causing a temporary reduction in temperature in the sprayed area, and a compounded temporary increase in the relative humidity level is produced until the sprayed area has re-warmed. The atomizing devices are connected to a source of water typically at ambient temperature, and operate by use of compressed air admitted thereinto for blowing delivery of moisture in droplet form. The quantity of moisture being delivered generally cannot be modulated but rather is fixed by the design and adjustment of the atomizer. Generally the atomizers are turned on by opening a valve to admit compressed air to the atomizer, and turned off by closing the valve. Typically the air control valve is pneumatically actuated, by application of actuating air from a pneumatic relay, or from an electrically actuated pilot solenoid valve. Typically, as with any such on-off final control element, automatic control has been accomplished in the on-off control mode, a group of atomizers being turned on when a humidity sensor indicates a condition drier than is desired, and turned off when the sensor indicates a humidity level more moist than is desired.

The automatic control of atomizers operated in the on-off control mode has not been as responsive to conditions as desired in situations where fine control is necessary, the cyclic nature of the on-off mode producing swings in the humidity levels detrimental to production efficiency and product quality. In particular, in areas requiring higher humidity levels for best operating results, even a slight rise of humidity over the desired level can lead to condensate formation on walls, structures, or machinery, the temperature of which may be higher than the dew-point at the desired humidity level but lower than the dew-point if the humidity is allowed to exceed the desired level by only a few percent. The rate and amplitude of the cyclic changes noted when using the on-off control mode are influenced by a number of factors, including the sensitivity and response-time characteristics of the humidity sensor, the level of moisture demand, the total installed atomizer capacity, the varying heat loads encountered, the time lag for evaporation of the atomized moisture and re-warming of the air cooled thereby, the size of the space being served, and the rate of air circulation.

One attempt at reducing the extent of the problem is disclosed in my prior U.S. Pat. No. 3,460,557, which discloses the use of a time proportioning control mode rather than an on-off control mode, and is pneumatic or pneumatic-electric in its operation. The device of that patent operates by pneumatically creating a continuing succession of time cycles, and utilizes the humidity proportional pneumatic signal from a humidity sensor to divide each time cycle into on periods and off periods which inversely proportion the amount of moisture delivered to the signal level from the sensor. Many years of experience with many installations have demonstrated the distinct superiority of this type control over the on-off type control, but undesirable characteristics of this pneumatic time-proportioning device have been noted. Being pneumatic-electric, an installation of the device requires both the installation of pneumatic tubing as well as electric circuitry. Also required is an almost totally clean compressed air supply. The device also requires a pneumatically operated sensor, typically requiring a large cabinet equipped with forced circulation for the air whose humidity is being controlled. Pneumatic humidity sensors are invariably of the dimensionally changing sensing element type, which suffer from slow response, and considerable hysteresis. The pneumatic control is mechanical and is subject to failure from wear. It utilizes elastomeric diaphragms and dynamic seals in delicate and dependent relation to each other, and they are subject to failure from aging and from attack by contaminants in the air supply.

Also, an operational problem with the device of the aforementioned patent has been experienced on some occasions, the solutions to which in the pneumatic configuration have proved impractical. The problem originates with the sensing device response-time characteristic, which frequently does not instantly change its output signal with a change in the measured condition but lags behind the actual measured condition, and with the aforementioned compounded increase in relative humidity upon evaporation of atomized moisture droplets, and ensuing decrease upon re-warming. Particularly when the sensing device is operated at a high sensitivity, it has been noted that the output from the sensor will remain stationary for some time after a change in condition, then suddenly will change over a relatively large range, due to the stick-slip frictional characteristics of a mechanical device. This can cause rapid intermittent operation of the control signal to the air control valve, resulting in dribbling atomizers and undue wear of valves, atomizers, and controls. One method to avoid this problem is to reduce the sensitivity of the sensor, but this broadens the range of variation of the condition being controlled.

The present invention is directed toward eliminating the problems associated with previous devices. It is entirely solid state electronic, thus mechanical wear is eliminated. It does not require either compressed air or pneumatic tubing, hence, installation is simpler and less expensive. It may utilize any one of several types of electronic humidity sensors, which generally are far more responsive to changes in humidity and hence do not require forced ventilation and is well suited for use with a sensor of the type disclosed in my co-pending U.S. patent application Ser. No. 828,895 filed Aug. 29, 1977. This makes possible a relatively small sealed enclosure to protect the entire device from accumulations of dust, dirt and lint, with only the sensing element exposed. In addition the electronic configuration makes possible a straightforward solution to the delayed response problem mentioned above by locking in the humidity proportional signal at a selected point in each successive time cycle for use thereafter in the cycle.

SUMMARY OF THE INVENTION

The apparatus of the present invention, for producing a timed control signal for actuation of a responsive device for changing a condition to a predetermined desired condition, comprises electronic means for sensing the condition, means for creating electronic signals proportional to the measure of the sensed condition within a sensitivity range, and electronic means for massaging or processing the proportional signals to create therefrom a cyclic series of timed control signals each of which has a duration during the cyclic period proportional to the difference between the sensed condition at a selected time in eacy cyclic period and the predetermined desired condition as related to the sensitivity range.

Briefly described, the apparatus of the present invention produces a timed control signal by means as aforesaid, and the massaging or processing means includes: Means for electronically creating a cyclic sawtooth direct current waveform signal of constant maximum amplitude and including a uniformly changing ramp signal portion, means for electronically rebasing and amplifying the proportional signal suitably for comparison with the ramp signal to cover a sensitivity range limited by a proportional signal corresponding to a selected condition and by another proportional signal corresponding to the predetermined desired condition, electronic means for comparison of the rebased and amplified signal with the ramp signal at each cycle thereof, and means for electronically creating from the comparison the timed control signal of duration during each cycle directly proportional to the difference between the rebased and amplified signal and the desired condition signal as related to the maximum amplitude of the ramp signal.

Preferably, the apparatus of the present invention provides means for sensing and measuring the condition continuously by an electrical impedance varying generally proportionally to the varying measure of the condition, and a constant amplitude alternating current voltage is applied across the varying impedance and a fixed impedance element in series therewith for producing alternating current voltages thereacross respectively proportional to the measure of the condition as sensed. The sawtooth signal creating means includes a raster circuit creating the ramp signal and returning it to a starting point for a subsequent like signal essentially instantaneously at the end of the ramp signal for sawtooth signal creating and includes means for selective adjustment of cycle time between sawteeth. The condition proportional signals creating means includes means for producing a direct current voltage signal proportional to the measure of the sensed condition. The re-basing and amplifying means includes means for (a) producing a re-basing direct current voltage signal corresponding to the proportional signal corresponding to a selected condition. The re-basing voltage signal is subtracted from the proportional direct current voltage signal to produce a re-based condition proportional direct current voltage signal and for (b) amplifying that re-based signal suitably for the comparison with the ramp signal (suitably in that a re-based and amplified signal corresponding to the selected condition has an amplitude equal to the minimum amplitude of the ramp signal and a re-based and amplified signal corresponding to the desired condition has an amplitude equal to the maximum amplitude of the ramp signal). The comparison is made of the re-based and amplified signal existing at a selected time in each ramp signal cycle by means of a sample and hold circuit for retaining the value of the re-based and amplified signal existing at that selected time for comparison with the changing ramp signal thereafter in each cycle, and the time selected occurs upon the ramp signal's return to the ramp signal starting point. The comparison means includes applying the re-based and amplified signal and the changing ramp signal to separate inputs of an operational amplifier for comparison thereby, and the operational amplifier reverses its output essentially at the time the value of the changing ramp signal starts to exceed the value of the re-based and amplified signal and maintains the reversal during the exceeding.

In the preferred embodiment of the invention, the alternating current voltage applied to the sensing means has a suitably selected frequency such that the sensing means impedance and the alternating current voltages across the sensing means impedance and the fixed impedance in series therewith vary essentially linearly proportionally with variations in the measure of the sensed condition in a suitable range of interest. The alternating current suitably has a sine wave form and a frequency in the order of 10 Hertz when the sensing means is sensing relative humidity. The sensing means impedance varies inversely with the measure of the sensed relative humidity. The means for applying the alternating current voltage includes an oscillator and means for isolating the oscillator from the impedance variations of the sensing means. The isolating means includes an operational amplifier receiving the alternating current voltage at its input and operated with unity feedback to its inverting input from its output and having its output connected across the sensing means and the fixed impedance in series therewith. The invention includes means for converting one of the conditional proportional alternating current voltages to a periodically updated continuous direct current voltage varying essentially linearly directly proportionally to the measure of the sensed condition in a suitable range of interest and means for suitably referencing the linear range of the updated direct current voltage to a zero signal for reading a reference signal in volts directly representing the condition to a suitable scale. The converting means comprises a buffered differential amplifier for producing at its output an isolated amplified condition proportional alternating current voltage wave form; a sample and hold circuit, having an input connected to the just-mentioned buffered output, and capable of being triggered for momentary opening thereof for reception of a direct current voltage signal thereinto for retention therein and transmission therethrough to the output thereof pending a subsequent triggering and opening of the input for reception of a subsequent direct current voltage signal for retention and transmission; means, actuated by the isolated amplified condition proportional alternating current wave form, for triggering and opening momentarily the sample and hold input at a like selected point in each cycle of the wave form for receiving an effective momentary direct current signal from the wave form, and thereby producing at the sample and hold output a continuous direct current signal updated at each cycle of the wave form to a value equal to the instantaneous direct current value of the waveform at the selected point thereof. The sample and hold circuit includes time delay circuits for varying the position of the selected point in the wave form and selectively determining the duration of the momentary opening of the input. The sawtooth signal creating raster circuit is isolated by transmitting the sawtooth signal through an operational amplifier operated with unity feedback to its inverting input; and the means for creating the timed control signal from the comparison of the rebased and amplified condition proportional signal and the ramp signal includes an electronic relay connected for operation by the aforementioned reversal of the output of the comparison operational amplifier.

BRIEF DESCRIPTION OF THE DRAWINGS

FIGS. 2a and 2b form a schematic wiring diagram showing the electronic components and their interconnecting circuitry comprising the controller of FIG. 1 as connected to the sensor and the humidification device.

DESCRIPTION OF THE PREFERRED EMBODIMENT

Function

The humidity controller of the preferred embodiment of the present invention provides cyclic time-proportioned "on" control signals to the compressed air valves which supply compressed air to and thereby actuate fixed delivery moisture atomizers for increasing the humidity in a controlled space. The controller is connected to an electronic humidity sensor located suitably in the space in which humidity is to be controlled, and compares an electronic signal proportional to the sensed humidity during an adjustable predetermined time cycle to an electronic signal proportional to the adjustably predetermined desired humidity over an adjustably predetermined sensitivity range lying below the desired humidity level during the time cycle in order to produce the requisite time-proportioned "on" signal within each cycle. The "on" portion of the signal is made proportional in the cycle to the difference between the humidity sensed and the humidity desired as a proportion of the sensitivity range. Therefore, the farther the sensed humidity lies below the desired humidity, the longer the atomizers will function at each cycle; and under extreme dry conditions, the atomizers will function essentially continuously until the humidity rises to be within the controller sensitivity range as will be explained hereinafter.

This function is perhaps easiest to understand by putting it into numbers; therefore, if it is assumed that the desired humidity is 50%, that the system characteristics permit a 10.0 sec. time cycle, and that a sensitivity range of 10% humidity is satisfactory, then those predetermined adjustments may be set into the controller. If the sensed humidity happens to be 30% at the time the system is actuated, that reading will be locked into the controller at the beginning of the first cycle. Since 30% is below the desired humidity of 50% and is also below the sensitivity range, which has been set to start at 40% and run to 50%, the initial comparison of sensed and desired humidities at the beginning of the first cycle will immediately create an "on" signal and the atomizers will function throughout the 10.0 sec. cycle to increase the humidity. If at the beginning of the second cycle the sensed humidity has increased by 3% to 33%, that reading will be locked into the controller, and initial comparison will again cause the atomizers to function throughout the second cycle.

Assuming similar humidification occurring at each cycle, the sensed humidity will rise to 36% at the beginning of the third cycle, 39% at the beginning of the fourth cycle, and 42% at the beginning of the fifth cycle, with the atomizers functioning throughout each 10.0 sec. period for the first through the fourth cycles. However, 42% humidity lies within the predetermined sensitivity range, so that at the beginning of the fifth cycle the sensed 42% reading will be locked into the controller, and the comparison of sensed and desired humidities will detect this condition and will not create the "on" signal to actuate the atomizers at the beginning of the cycle. Since the sensitivity range covers 10%, and the sensed 42% reading departs 8% from the predetermined desired 50% humidity, the controller will function to create the "on" signal after 2.0 sec. of the fifth cycle has passed, thereby causing the atomizers to function for 8.0 sec. in the fifth cycle, which could raise the humidity by $3\% \times (8.0/10.0) = 2.4\%$ to 44.4% at the beginning of the sixth cycle. Similarly, the atomizers would be caused to function for approximately 5.6 sec. in the sixth cycle, raising the humidity by $3\% \times (5.6/10.0) = 1.68\%$ to 46.08% at the beginning of the seventh cycle. Similarly, during the seventh cycle, the atomizers will function for approximately 3.9 sec. raising the humidity by $3\% \times (3.9/10.0) = 1.17\%$ to 47.25%.

At succeeding cycles, the atomizers will function for successively shorter periods during each cycle, bringing the sensed humidity closer and closer to the desired 50%, until the humidity loss in the room while the atomizers are non-functioning equals the humidity gain while the atomizers are functioning, whereby the space will be maintained at an average humidity closely approximating the desired 50%. It is to be understood that the above example is illustrative only, and not taken from tests.

Structure and Operation

Having explained in broad terms above how the humidity controller of the present invention functions, I will now describe the structure therefor and its operation. As shown schematically in FIG. 1, the humidity controller 10 is suitably connected electrically to an electronic humidity sensor element or sensing means 12 for sensing and measuring humidity and to an electrically controlled air valve or responsive device 14, the sensor 12 being located suitably in the space (not shown) for which humidity control is desired. The valve 14 is connected by suitable conduits (not shown) to a source of compressed air (not shown), and to at least one moisture atomizer (not shown) suitably located to spray moisture droplets into the space for which humidity control is desired. The controller may be located in the humidified space or not, as preferred, and may well be placed in a control room under the watch of supervisory personnel.

Figures 1, 2:
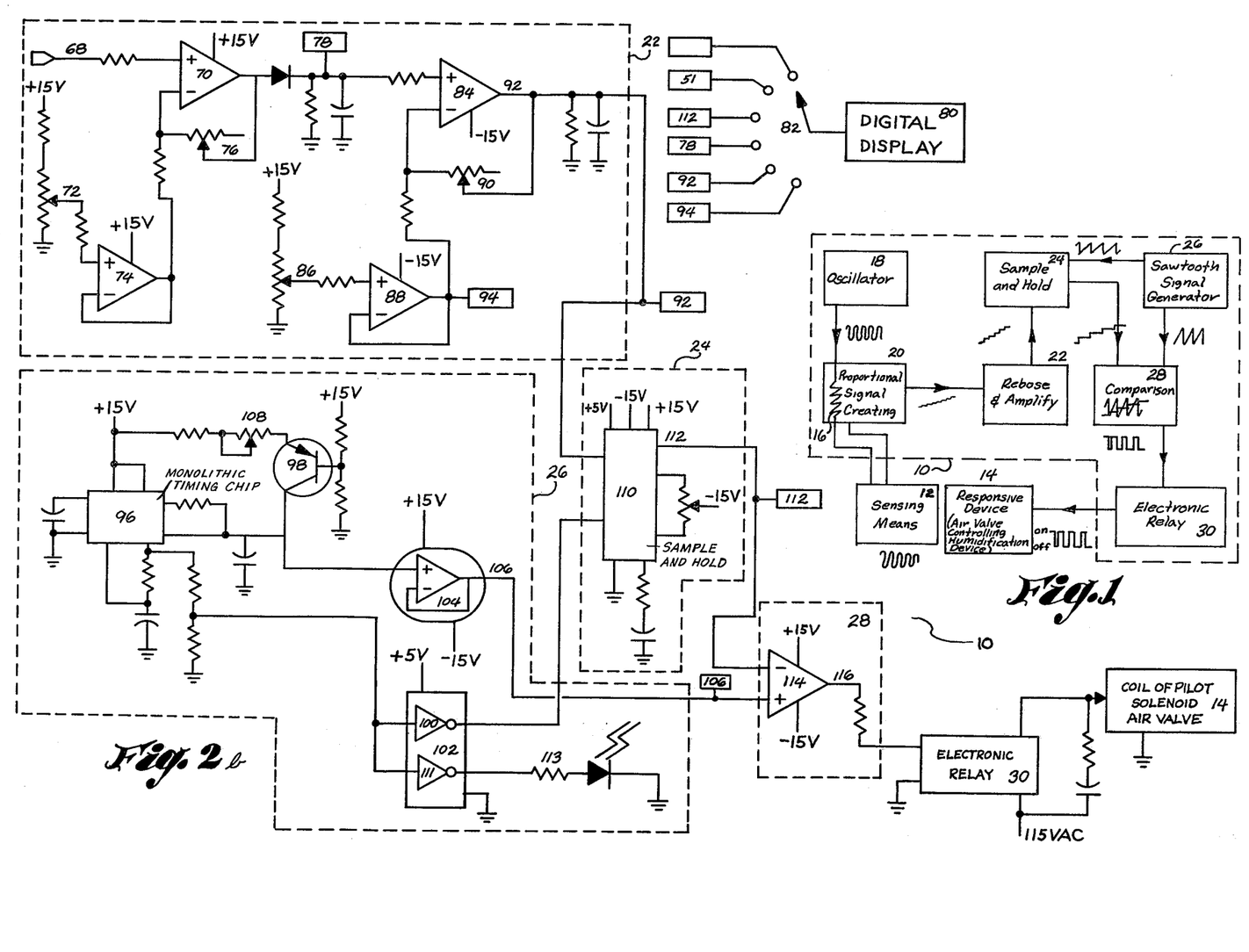
FIG. 1 is a block diagram showing schematically the relation of the controller of the present invention to a humidity sensor and a humidification device, as well as the relation of the functional circuit sections within the controller and the electronic waveforms present therein.

The block diagram of FIG. 1 shows that the sensing means 12 is excited through an essentially fixed impedance or resistance 16 by an oscillator 18, thereby producing across said sensing means 12 and said resistance 16 respectively alternating current voltages proportional to the measure of the relative humidity condition as sensed. The impedance 16 is included in a proportional signal creating means 20, and the alternating current voltage signal across the impedance 16 is used to produce a direct current voltage varying proportionally with the measure of the value of the relative humidity sensed by the sensor 12. This condition proportional direct current voltage signal is transmitted to a re-basing and amplifying means 22 where it is re-based to encompass a range of interest between a desired relative humidity condition and a selected relative humidity condition lying therebelow. The re-based and amplified direct current condition proportional voltage is transmitted to a sample and hold circuit 24 which is gated by a signal from a sawtooth signal generator 26 to momentarily receive the essentially instantaneous value of the re-based and amplified direct current condition proportional voltage at the moment of gating, and that instantaneous value is held by the sample and hold circuit 24 and transmitted therefrom to a comparison means 28 which also receives a ramp signal generated by the sawtooth signal generator 26 for comparison therewith.

The held signal transmitted to the comparison means is compared with the ramp signal during each sawtooth signal cycle, and the comparison means 28 reverses its output signal at essentially the instant when the ramp signal exceeds the held condition proportional signal. The signal reversal at the comparison means 28 is transmitted to an electronic relay 30 for operation thereof. Operation of the electronic relay 30 in turn operates the responsive device or air valve 14 to supply compressed air to moisture atomizers (not shown) for increasing the humidity in the controlled space. The signal reversal from the comparison means 28 continues until the ramp signal ends, thereby creating the desirable time-proportioned signal to the responsive device 14 for actuation thereof during a part of each sawtooth cycle proportional to the departure of the sensed humidity condition from the desired humidity condition within the range of interest of sensitivity encompassing the desired humidity condition and a selected humidity condition lying therebelow.

The above-described electronic means massages or processes the humidity condition proportional signals to create therefrom the above-described timed control signals for changing an existing humidity condition to a predetermined desired humidity condition with an accuracy and dependability atypical of the previous commercial apparatus for controlling humidity.

Figure 2A:
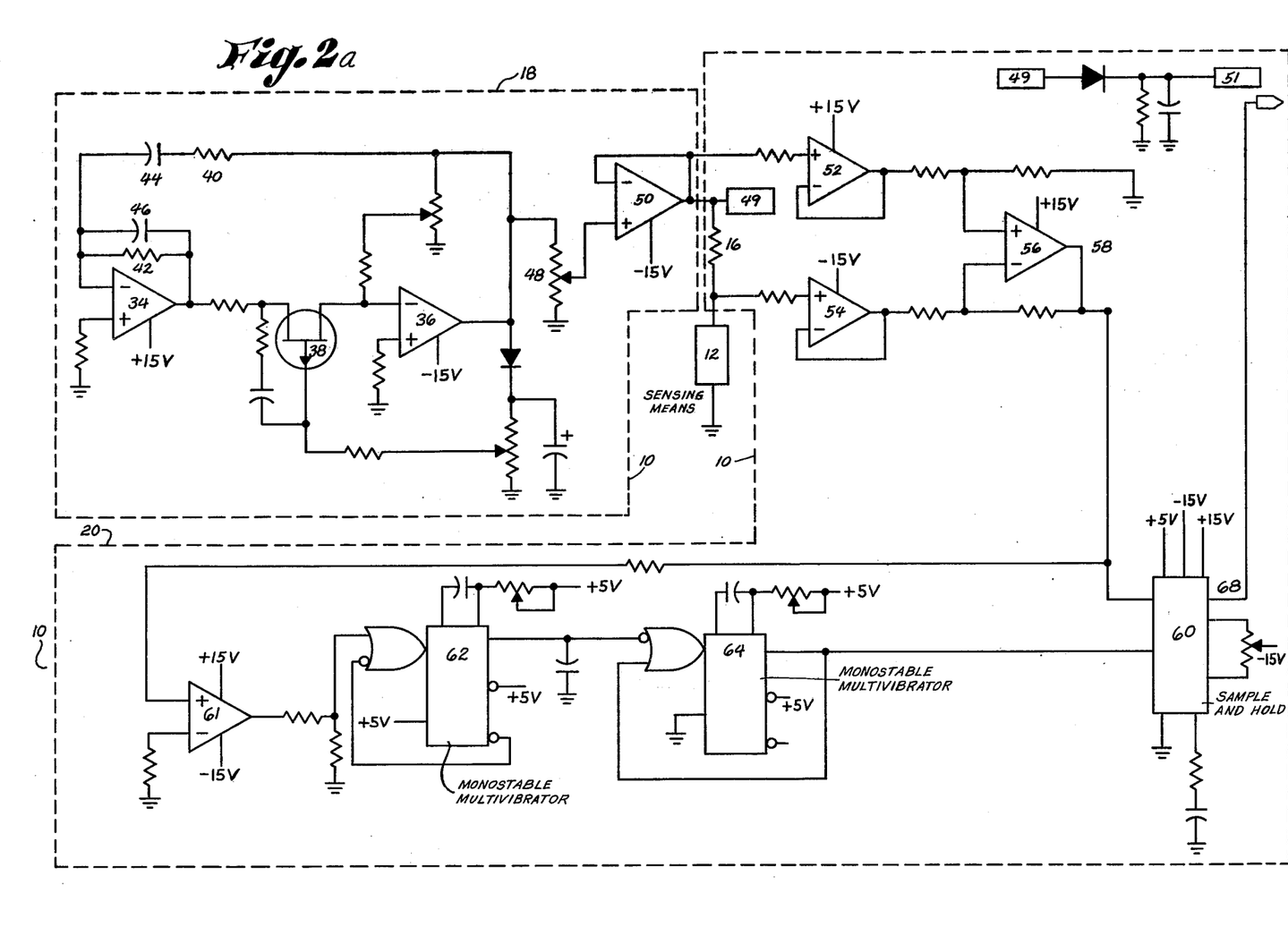

A schematic circuit diagram, FIGS. 2a and 2b, shows the controller 10 in detail. The controller 10 is constructed entirely from solid state components, many of them integrated circuits, and all so well known to those skilled in the art that they are represented schematically in FIG. 2 and indentified by terms of the art in this description such that their function will be understood without lengthy explanations. The humidity sensor 12 used with this controller 10 is desirably of the type shown in my aforementioned copending U.S. patent application and is excited by an alternating current voltage to avoid any polarization. The excitation level must be constant and since the impedance of the sensor 12 will desirably decrease linearly with an increase in relative humidity, and vice versa, it is preferred to use a sine wave alternating current voltage wave form at a frequency of 10 Hertz which has been found to avoid undesirable wave form distortion and resultant inaccuracies and to provide desirable response linearity to relative humidity changes whether caused from specific moisture content changes or from temperature changes or a combination thereof when used with a sensor 12 of the type shown in my aforementioned patent application. Since it is desired to produce a signal which increases with an increase in relative humidity, the sensor is operated in series with an essentially fixed value resistor or impedance 16, and the excitation is provided by a conventional solid state oscillator or sine wave generator circuit comprising operational amplifiers 34 and 36 and transistor 38 and their associated components including resistors 40 and 42 and capacitors 44 and 46 which taken together determine the frequency. Amplitude stability of the wave form is assured by the bias returned to the gate of transistor 38. The wave form appears across variable resistor 48, which is used to adjust the specific amplitude for exciting the sensor 12 by feeding the suitably adjusted wave form to the non-inverting input of the operational amplifier 50 operating with 100% or unity feedback to its inverting input to isolate or buffer the oscillator circuit from the sensor 12. The buffered signal from the output 49 of the operational amplifier 50 is then applied to the series circuit formed by the sensor 12 and the resistor 16, and the rectified amplitude of this buffered signal may be read at the measuring point 51 as explained hereinafter.

Thus, the signal produced across resistor 16 will increase with a decrease in the impedance of the sensor 12 caused by an increase in moisture level. The signal developed across the resistor 16 is applied to the non-inverting inputs of two operational amplifiers 52 and 54, operate with +15 V and −15 V supply voltages respectively and operated with unity feed back to their inverting inputs to produce minimum loading variations on the circuit for sensor 12. The outputs from the operational amplifiers 52 and 54 are then taken into the non-inverting and inverting inputs of an operational amplifier 56, these last three operational amplifiers 52, 54, and 56 forming with their associated components a buffered differential amplifier which delivers at the output 58 of the operational amplifier 56 a 10 Hertz sine wave alternating current signal voltage which increases in amplitude desirably linearly proportionally with an increase in sensed relative humidity. The circuits to this point are well known and widely used.

The usual methods of detection by either half or full wave rectification of a 10 Hertz signal such as that appearing at output 58 have been found unsatisfactory for this apparatus, due to the inability of any reasonably sized capacitive filter to produce an output with acceptable levels of ripple. A novel means within said proportional signal creating means 20 for converting the condition proportional alternating current voltage produced across the resistance 16 to a periodically updated continuous direct current voltage varying essentially linearly directly proportionally to the measure of the sensed relative humidity condition as represented by the peak values of the 10 Hertz signal at the output 58 for input to a sample and hold circuit 60 is described below:

The signal at output 58 is amplified by the operational amplifier 61 and is used to trip a monostable multivibrator 62 at the instant the signal at output 58 crosses the zero amplitude axis in the positive direction. The 10 H signal will reach its maximum positive amplitude 25 milliseconds later, and the output of the multivibrator 62 is a square wave in the form of a positive DC pulse whose duration may be set to any desired time, in this case say 24.5 ms. The change in this square wave from its positive value back to zero is used to trigger a second monostable multivibrator 64. The square wave output from the second multivibrator 64 beginning 24.5 ms after the beginning of the positive signal rise at output 58, may also be set for any desired duration, in this case 1 ms. Thus the output from the second multivibrator 64 is a square wave positive DC pulse of 1 ms duration, centered on the positive peak amplitude of the humidity proportional signal from output 58.

The humidity proportional sine wave signal from output 58 is applied to the input of the sample and hold circuit 60. The output of the second multivibrator 64 is used as a gate signal to open the input of the sample and hold circuit 60 0.5 ms before the signal peak, and to close and hold 0.5 ms after the signal peak. The rate of change of amplitude of a sine curve is very small during a close interval around the peak, actually being zero at the peak. Thus the peak value of the alternating current signal may be injected into the sample and hold 60 with very high accuracy, governed by the duration of the square wave output from the second multivibrator 64. In fact, the time period of the first multivibrator 62 may be set to inject into the sample and hold 60 the signal amplitude that exists at any point on the signal from output 58, thus making the signal at the output 68 from the sample and hold 60 equal to the average amplitude, RMS amplitude, or any other desired characteristic value of the alternating current voltage wave form from the output 58.

The output from the sample and hold 60 is a pure direct current voltage, without ripple, changing in amplitude stepwise with changes in input alternating current wave form signal amplitude. This produces a pure direct current voltage which may then be referenced for indication and re-based and amplified for control without the disturbance due to ripple. The signal at output 68 is a periodically updated continuous direct current voltage varying essentially linearly directly proportionally to the measure of the sensed relative humidity in a suitable range of interest which may typically extend from 75° F. to 85° F. and from 40% to 85% relative humidity in a textile mill.

The unmodified direct current signal created at the output 68 when derived by use of a sensing element as disclosed in my aforementioned copending U.S. patent application, while linear in its relation to the true relative humidity in a range of interest as aforementioned, is non-linear in other ranges, and a straight line plot of this direct current voltage signal versus true relative humidity in the range of interest when extended to the zero relative humidity axis will cross the output 68 voltage axis at a point greater than zero voltage. Therefore, the signal from the output 68, which appears at the upper left of FIG. 2b, is fed to the non-inverting input of a differencing operational amplifier 70 having an adjustable gain, and an offset voltage signal adjusted by the resistor 72 and delivered through the buffer operational amplifier 74 is fed to the inverting input of the amplifier 70. For any given gain of the amplifier 70 as adjusted by the resistor 76, the offset voltage signal from resistor 72 will permit shifting the projected plotted straight line to the origin, representing zero voltage output at zero true relative humidity. The gain adjustment by resistor 76 permits changing the slope of the plotted straight line to scale the output of the amplifier 70 as it appears at the measuring point 78 to be such that the digital display 80 will indicate true humidity directly when its selector switch 82 is placed at measuring point 78. Typically, a six volt reading at point 78 may represent 60 percent relative humidity, and 10 volts may represent 100 percent relative humidity, thereby giving increments of 0.1 volt per one percent change in relative humidity.

The signal at the measuring point 78 is delivered to the non-inverting input of a second differencing operational amplifier 84 included in the re-basing and amplifying means 22, and a re-basing direct current voltage signal corresponding to a direct current voltage condition proportional signal corresponding to a selected relative humidity condition forming the lower limit of the sensitivity range is selectively produced by means of the variable resistor 86 and transmitted through the buffer operational amplifier 88 to the inverting input of amplifier 84. A variable resistor 90 determines the gain of the amplifier 84 and thereby the maximum amplitude of a direct current voltage signal which may appear at the output 92 of the amplifier 84.

The signal appearing at the output 94 of amplifier 88 is adjusted to serve as a re-basing signal for subtraction by the amplifier 84 from the scaled proportional voltage signal appearing at the measuring point 78 and at the non-inverting input of amplifier 84 so that the signal appearing at the output 92 thereof will be zero volts when the scaled proportional signal voltage at point 78 corresponds to a selected humidity condition at the lower limit of the sensitivity range lying below the predetermined desired humidity condition. The gain of the amplifier 84 is adjusted by the resistor 90 so that the re-based and amplified proportional signal at the output 92 will be 10 volts when the scaled proportional signal voltage at point 78 corresponds to the predetermined desired humidity condition lying at the upper limit of the sensitivity range. E.g., if the desired relative humidity is 50%, and a sensitivity range of 10% is satisfactory as in the example at the beginning of this description, then the re-basing signal appearing at the inverting input of the amplifier 84 must be adjusted to be 4 volts in order to produce a zero volt re-based proportional direct current voltage signal at the output 92 when the signal at the point 78 reads 4 volts corresponding to the selected 40% relative humidity condition proportional signal forming the lower limit of a sensitivity range. When the humidity condition proportional direct current voltage signal at the point 78 is adjusted to be 5 volts corresponding to said predetermined desired humidity condition proportional signal forming the upper limit of the sensitivity range, then the gain of the amplifier 84 must be adjusted to produce a 10 volt re-based and amplified relative humidity condition proportional direct current voltage signal at the output 92 suitable for comparison, as explained hereinafter, to the ramp signal voltage produced by the sawtooth signal generator 26.

The digital display 80, formed by a digital solid state electronic voltmeter, is useful in making adjustments and calibrations as just described, and its selector switch 82 permits taking voltage readings readily at any of the measuring points therefor such as 51, 78, 92, and 94 as indicated in FIGS. 2a and 2b.

Means for creating electronically a cyclic sawtooth direct current wave form signal of constant maximum amplitude and having a uniformly changing ramp signal included as a portion thereof formed by a sawtooth signal generator 26 includes a raster circuit for creating the ramp signal and returning it essentially instantaneously to a starting point for a subsequent ramp signal and thereby creating a sawtooth signal. The raster circuit is formed by a monolithic timing chip 96, a transistor 98, the upper section 100 of a dual inverter 102, a buffer operational amplifier 104 operated at unity feedback to its inverting input, and their associated resistances and capacitances, and transmits to the output 106 of amplifier 104 an isolated sawtooth wave form voltage varying from zero to 10 volts and having a cycle time between sawteeth selectively adjustable by the variable resistor 108 and typically adjustable for this preferred embodiment from eight to sixty seconds in length. The raster circuit is isolated by the buffer amplifier 104.

The upper section 100 of the dual inverter 102 is triggered by a pulse from the timing chip 96 at the instant the sawtooth signal at the output 106 peaks out and returns to zero and upper section 100 is connected to momentarily open the gate of a second sample and hold circuit 110 to accept at the input thereof the instantaneous value of the re-based and amplified humidity condition proportional signal from the output 92. The sample and hold 110 transmits the re-based and amplified signal to its output 112 and retains the signal there until its gate is opened again at the next sawtooth signal cycle for acceptance of another such signal. The output 112 is connected to the inverting input of an electronic means 28 for comparison of the rebased and amplified signal with the ramp signal comprising an operational amplifier 114, and the ramp or sawtooth signal from the output 106 is connected to the non-inverting input to the amplifier 114. The re-based and amplified signal held by the sample and hold 110 is thereby compared to the rising ramp signal for the duration of each sawtooth cycle, and when the ramp signal voltage rises above the rebased and amplified humidity condition proportional signal, the operational amplifier 114 produces a timed control signal for the remaining duration of the ramp signal at its output 116. The output 116 being connected to the electronic relay 30, the timed control signal operates the relay 30, which in turn is connected to and operates a responsive device in the form of the electrically controlled air valve 14 which admits air to moisture delivering atomizers in the controlled space for increasing the humidity level therein. Since the re-based and amplified signal may be held steady at a different level by the sample and hold 110 during each cycle while the ramp signal rises toward it, the time during each sawtooth cycle at which the operational amplifier 114 produces the timed control signal will depend on the level of the re-based and amplified signal, and the higher said level, the later in the cycle the control signal will be produced, so that the duration of the timed control signal during each cycle is directly proportional to the difference between the re-based and amplified signal and the desired humidity condition signal as related to the maximum amplitude of the ramp signal which represents the sensitivity range.

The particular embodiment disclosed in full detail herein and illustrated in the drawings has been provided for disclosure purposes only, and it is recognized that other detailed curcuits could form the means claimed and that other conditions than humidity could be controlled thereby, and it is not intended to limit the scope of the present invention, which is to be determined by the scope of the claims.

I claim:
1. An apparatus for producing a timed control signal for actuation of a responsive device for changing a condition to a predetermined desired condition, said apparatus comprising
 (a) electronic means for sensing the condition;
 (b) means for creating electronic signals proportional to the measure of said condition being sensed by said electronic means within a sensitivity range and cyclic electronic ramp signals rising uniformly to a maximum amplitude representing said sensitivity range;
 (c) electronic means for processing said proportional signals to create therefrom a series of timed control signals by comparison of said proportional signals and said rising cyclic ramp signals at each cycle thereof and creating one of said timed control signals for the remaining duration of each cycle at the time that each ramp signal rises above each proportional signal.

2. An apparatus for producing a timed control signal for actuation of a responsive device for changing a condition to a predetermined desired condition, said apparatus comprising
 (a) means for sensing the condition;
 (b) means for creating an electronic signal proportional to the measure of said condition being sensed by said means for sensing;
 (c) means for creating electronically a cyclic sawtooth direct current wave form signal of constant maximum amplitude and having a cycle including a uniformly changing ramp signal of like maximum amplitude included as a portion thereof;
 (d) means for electronically re-basing and amplifying said proportional signal suitably for comparison with said ramp signal to cover a sensitivity range which has limits set by a proportional signal corresponding to a selected condition and by another proportional signal corresponding to said predetermined desired condition;
 (e) an electronic means for comparison of said proportional signal after said re-basing and amplifying with said ramp signal at each said cycle of said sawtooth signal; and
 (f) means for electronically creating from said comparison said timed control signal whose duration during each said cycle is directly proportional to the difference between said proportional signal after said re-basing and amplifying and said desired condition signal as related to said maximum amplitude of said ramp signal.

3. An apparatus for producing a timed control signal according to claim 2 and characterized further in that said sensing means senses said condition continuously and said means (b) continuously creates said signal proportional to the measure of said signal being sensed.

4. An apparatus for producing a timed control signal according to claim 3 and characterized further in that said sensing means has an electrical impedance varying generally proportionally to variations in the measure of said condition.

5. An apparatus for producing a timed control signal according to claim 4 and characterized further by an element included in means (b) thereof having an essentially fixed impedance and connected in series with said sensing means and by means included in means (b) thereof for applying an alternating current voltage of constant amplitude across said essentially fixed impedance element and said sensing means in series for producing alternating current voltages across said sensing means and said element respectively proportional to the measure of the condition as sensed.

6. An apparatus for producing a timed control signal according to claim 5 and characterized further in that said alternating current voltage has a frequency selected suitably such that said sensing means impedance and said alternating current voltages proportional to the measure of said condition being sensed vary essentially linearly with variations in the measure of said condition in a suitable range of interest.

7. An apparatus for producing a timed control signal according to claim 6 and characterized further by said alternating current voltage having a sine wave form and a frequency in the order of 10 Hertz, said sensing means sensing relative humidity, and said sensing means impedance varying inversely with the measure of said relative humidity being sensed.

8. An apparatus for producing a timed control signal according to claim 6 and characterized further in that said means included in means (b) thereof for applying an alternating current voltage comprises an oscillator and means for isolating said oscillator from said varying impedance of said sensing means including an operational amplifier receiving at its input said alternating current voltage and operated with unity feedback to its inverting input from its output and its output connected for said applying of said alternating current voltage across said fixed impedance element and said sensing means.

9. An apparatus for producing a timed control signal according to claim 6 and characterized further by means included in said means (b) thereof for converting one of said condition proportional alternating current voltages to a periodically updated continuous direct current voltage varying essentially linearly directly proportionally to the measure of said sensed condition in a suitable range of interest.

10. An apparatus for producing a timed control signal according to claim 9 and characterized further by means included in means (b) thereof for suitably referencing said updated direct current voltage to a zero signal for reading a referenced signal in volts directly representing said condition to a suitable scale.

11. An apparatus for producing a timed control signal according to claim 9 and characterized further in that said converting means comprises a buffered differential amplifier for producing at its output an isolated amplified condition proportional alternating current voltage wave form, a sample and hold circuit having an input connected to said buffered output and capable of being triggered for momentary opening thereof for reception of a direct current voltage signal into said sample and hold circuit for retention therein and transmission therethrough to the output thereof pending a subsequent triggering and opening of said input for reception of a subsequent said direct current voltage signal for said retention and transmission, and means actuated by said isolated amplified condition proportional alternating current wave form for triggering and opening momentarily said sample and hold input at a like selected point in each cycle of said wave form for receiving an effective momentary direct current signal therefrom and thereby producing at the sample and hold output said continuous direct current voltage updated at each cycle of said wave form to a value equal to the instantaneous direct current value of said wave form at said selected point thereof.

12. An apparatus for producing a timed control signal according to claim 11 and characterized further in that said sample and hold circuit includes a time delay circuit for varying the position of said selected point in said wave form and a second time delay circuit for selectively determining the duration of said momentary opening of said input.

13. An apparatus for producing a timed control signal according to claim 2 and characterized further in that said means for creating a sawtooth signal includes a raster circuit for creating said ramp signal and returning said ramp signal to a starting point for a subsequent ramp signal essentially instantaneously at the end of said ramp signal for said sawtooth signal creating thereby.

14. An apparatus for producing a timed control signal according to claim 13 and characterized further in that said means for creating a sawtooth signal includes means for selectively adjusting the cycle time of said cyclic sawtooth wave form signal.

15. An apparatus for producing a timed control signal according to claim 14 and characterized further in that said raster circuit is isolated by transmitting said sawtooth signal through an operational amplifier operated with unity feedback to its inverting input.

16. An apparatus for producing a timed control signal according to claim 2 and characterized further in that said means (b) includes means for producing a direct current voltage signal proportional to said measure of said sensed condition and said re-basing and amplifying means includes means for producing a re-basing direct current voltage signal corresponding to said one of said proportional signals corresponding to a selected condition for subtraction from said proportional direct current voltage signal to produce a re-based condition proportional direct current voltage signal.

17. An apparatus for producing a timed control signal according to claim 16 and characterized further in that said re-basing and amplifying means includes for amplifying said re-based direct current voltage signal for producing a re-based and amplified condition proportional direct current voltage signal suitable for said comparison with said ramp signal in that a re-based and amplified signal corresponding to said selected condition has an amplitude equal to the minimum amplitude of said ramp signal and a re-based and amplified signal corresponding to said desired condition has an amplitude equal to the maximum amplitude of said ramp signal.

18. An apparatus for producing a timed control signal according to claim 2 and characterized further in that said comparison is made of said proportional signal after said re-basing and amplifying as it exists at a selected time in each said cycle of said sawtooth signal.

19. An apparatus for producing a timed control signal according to claim 18 and characterized further in that said means for comparison includes a sample and hold circuit for retaining the value of said proportional signal after said re-basing and amplifying existing at said selected time in each said cycle of said sawtooth signal for comparison with said changing ramp signal thereafter in each said cycle.

20. An apparatus for producing a timed control signal according to claim 19 and characterized further in that said means for creating a sawtooth signal includes a raster circuit for creating said ramp signal and returning said ramp signal to a starting point for a subsequent ramp signal essentially instantaneously at the end of said ramp signal for said sawtooth signal creating thereby and in that said selected time in each said cycle of said sawtooth signal occurs upon said returning said ramp signal to said starting point.

21. An apparatus for producing a timed control signal according to claim 2 and characterized further in that said means for comparison comprises an operational amplifier whereat said proportional signal after said re-basing and amplifying is applied to one input thereof and said changing ramp signal is applied to another input thereof for comparison thereby.

22. An apparatus for producing a timed control signal according to claim 21 and characterized further in that said operational amplifier reverses its output essentially at the time when the value of said changing ramp signal starts to exceed the value of said proportional signal after said re-basing and amplifying and remains reversed while said ramp signal exceeds said proportional signal after said re-basing and amplifying.

23. An apparatus for producing a timed control signal according to claim 22 and characterized further in that said means for creating from said comparison said timed control signal comprises an electronic relay connected for operation by said reversed output of said operational amplifier.

* * * * *

UNITED STATES PATENT OFFICE
CERTIFICATE OF CORRECTION

Patent No. 4,161,660  Dated July 17, 1979

Inventor(s) Donald A. Gallant

It is certified that error appears in the above-identified patent and that said Letters Patent are hereby corrected as shown below:

Column 3, line 4, delete "eacy" and insert therefor --each--.
Column 8, line 20, delete "operate" and insert therefor --operated--.
Column 14, line 22, after "includes" insert --means--.

Signed and Sealed this

Sixth Day of May 1980

|SEAL|

Attest:

SIDNEY A. DIAMOND

Attesting Officer

Commissioner of Patents and Trademarks